Dec. 13, 1960    J. H. PAYNE, JR., ET AL    2,964,415
AQUEOUS FILM FORMING COMPOSITIONS
Filed March 12, 1958
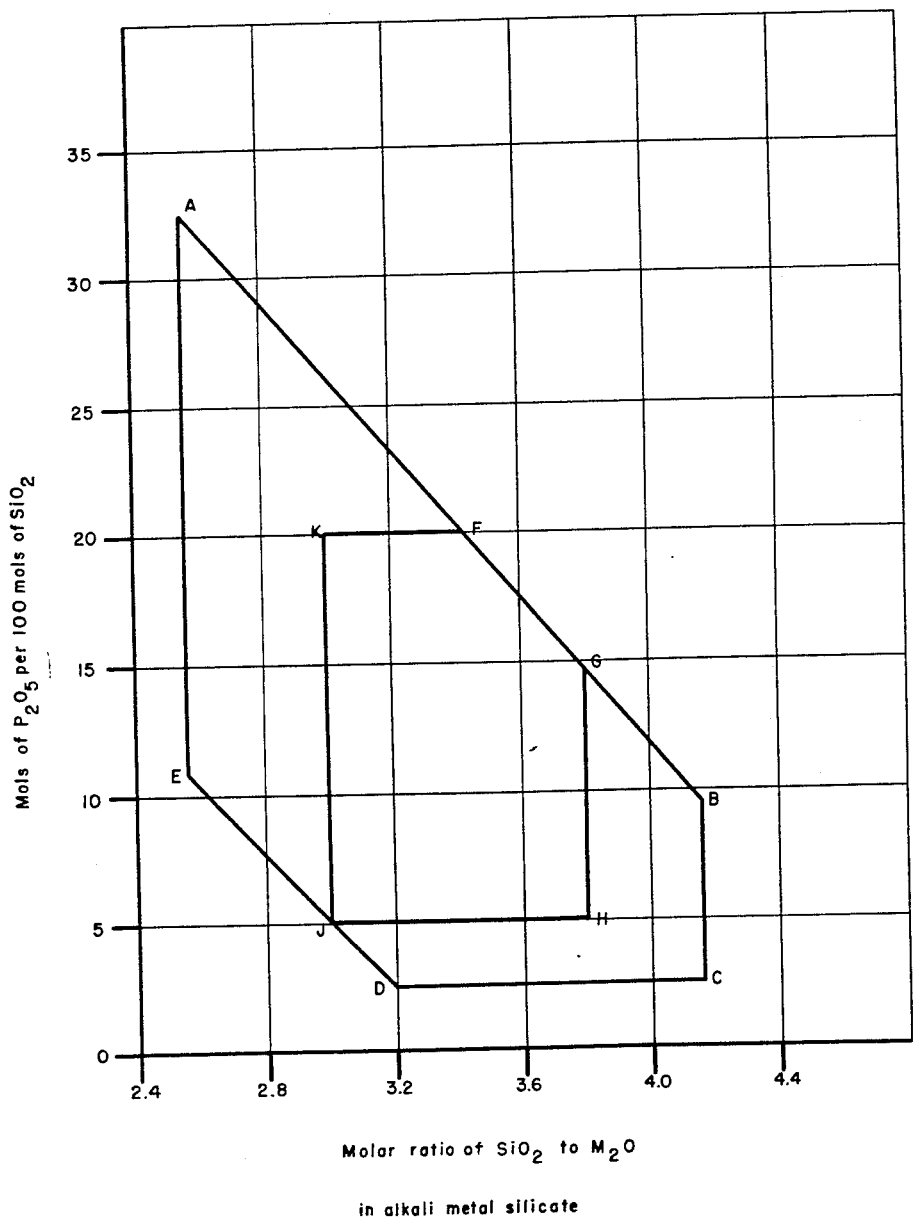
INVENTORS
JOHN H. PAYNE JR.
GEORGE D. NELSON
BY
ATTORNEY

United States Patent Office 2,964,415
Patented Dec. 13, 1960

2,964,415

AQUEOUS FILM FORMING COMPOSITIONS

John H. Payne, Jr., Ladue, and George D. Nelson, St. Louis, Mo., assignors to Monsanto Chemical Company, St. Louis, Mo., a corporation of Delaware Filed Mar. 12, 1958, Ser. No. 720,941

16 Claims. (Cl. 106—74)

This invention relates to aqueous film forming compositions for adhesive and/or coating purposes, more particularly to compositions of this type containing dissolved therein an alkali metal silicate and an alkali metal polyphosphate in certain proportions as hereinafter defined. Additionally this invention relates to processes for producing a film comprising the dried residue of the film forming composition of this invention, to the dried residue so produced and to substrata having the dried residue adhered thereto.

Aqueous solutions of alkali metal silicates have long been used as adhesives for cellulosic materials such as cardboard and plywood and for providing protective and decorative coatings for concrete, metals, wood and other surfaces. However, the residual films obtained upon drying the aqueous solutions are of limited application in view of their poor resistance to water and uptake of moisture in atmospheres of high relative humidity. In accordance with this invention it has been found that a composition comprising an aqueous solution of an alkali metal silicate and an alkali metal polyphosphate in certain proportions defined hereinafter provides a film on drying for coating and/or adhesive purposes characterized by toughness, firm adherence, and improved resistance to water and to highly humid conditions.

Alkali metal silicates comprise a continuous series of molar ratios of $SiO_2$ (silicon dioxide) to $M_2O$ (alkali metal oxide wherein M is an alkali metal such as sodium, potassium or lithium). The alkali metal silicates of this invention are those having a molar ratio of $SiO_2$ to $M_2O$ of 2.56:1 to 4.16:1. The preferred silicates of this invention are the sodium silicates, particularly those having a molar ratio of $SiO_2$ to $Na_2O$ (sodium oxide) of about 3.0:1 to about 3.8:1.

Alkali metal polyphosphates comprise a continuous series of molar ratios of $P_2O_5$ (phosphorus pentoxide) to $M'_2O$ (alkali metal oxide wherein M' is an alkali metal such as sodium, potassium or lithium). The alkali metal polyphosphates of this invention are those crystalline and amorphous or glassy polymeric phosphates having more than 2 but preferably more than 3 phosphorus atoms, and a molar ratio of $M'_2O$ to $P_2O_5$ of about 0.8:1 to about 1.7:1. These polyphosphates consist of molecules in which the phosphorus atoms are held together through shared oxygen atoms and are well described in the literature. Among the operable crystalline polymeric phosphates of this invention are ring polymers such as sodium trimetaphosphate having a molar ratio of $Na_2O$ to $P_2O_5$ of 1:1 often identified by the empirical formula $Na_3(PO_3)_3$ and sodium tetrametaphosphate having a molar ratio of $Na_2O$ to $P_2O_5$ of 1:1 often identified by the empirical formula $Na_4(PO_3)_4$. Other operable crystalline polymeric phosphates of this invention are the chain polymers such as the high or low temperature form (or mixtures thereof) of sodium triphosphate having a molar ratio of $Na_2O$ to $P_2O_5$ of 1.67:1 often identified by the empirical formula $Na_5P_3O_{10}$, potassium triphosphate having a molar ratio of $K_2O$ to $P_2O_5$ of 1.67:1 often identified by the empirical formula $K_5P_3O_{10}$, potassium Kurrol's salt sometimes termed "potassium metaphosphate" having a molar ratio of $K_2O$ to $P_2O_5$ of 1:1. Of the polymeric alkali metal phosphates of this invention the sodium polyphosphate glasses, that is the amorphous compositions having a $Na_2O/P_2O_5$ molar ratio between 1 and 1.7 are preferred. As has been pointed out in various literature references (e.g. J.A.C.S. 72, pp. 644–655 (1950)) these phosphate glasses are mixtures of water-soluble, straight-chain, polymeric materials made up of alternating phosphorus and oxygen atoms. These mixtures of linear polyphosphates can be characterized in terms of an average chain length, $\bar{n}$. The term "chain length" refers to the number of phosphorus atoms in the straight chain polymer. The average chain length of the mixture of polymers in a sodium phosphate glass is primarily a function of the $Na_2O/P_2O_5$ molar ratio in the melt from which the glass was formed. The predominant polymer in such a mixture has a chain length equal to the whole number most closely approaching the value of the average chain length. The proportions of the other chain length polymers in the mixture become progressively smaller as the chain length increases or decreases from the average chain length. The average chain length of the glasses becomes increasingly greater as the $Na_2O/P_2O_5$ molar ratio decreases ranging from a chain length of 3 when the $Na_2O/P_2O_5$ molar ratio is approximately 1.7 to a chain length of several thousands as the molar ratio of $Na_2O$ to $P_2O_5$ approaches unity. A particularly useful group of this class are those linear sodium polyphosphate glasses having a molar ratio of $Na_2O$ to $P_2O_5$ of about 1.1:1 to 1.55:1 many of which are termed "sodium hexaphosphate," "sodium septaphosphate," "sodium decaphosphate," "sodium octadecaphosphate," etc. Still other operable polymeric alkali metal phosphates of this invention are the "ultraphosphates" which are amorphous or crystalline and are characterized by cross-linked chains and/or rings. These polyphosphates are generally characterized by a molar ratio of $M'_2O$ to $P_2O_5$ of about 0.8:1 to about 1:1.

The respective amounts of alkali metal silicate (anhydrous basis) and alkali metal polyphosphate (anhydrous basis) in the film forming compositions of this invention will be water-soluble amounts which provide a homogeneous solution containing for each 100 mols of $SiO_2$ in the form of alkali metal silicate 2.5 to 32.5 mols of $P_2O_5$ in the form of alkali metal polyphosphate, the proportions of the stated constituents being chosen so as to be represented by a point falling within the area bounded by the pentagon ABCDE on the chart shown in the attached Figure 1. It is particularly preferred, however, that the homogeneous solution contain for each 100 mols of $SiO_2$ in the form of alkali metal silicate but about 5 to about 20 mols of $P_2O_5$ in the form of alkali metal polyphosphate, the preferred proportions being chosen so as to be represented by a point falling within the area bounded by the pentagon FGHJK on the chart shown in the attached Figure 1.

With respect to the pentagons ABCDE and FGHJK on the chart shown in the attached Figure 1 the respective points thereof define a composition as follows:

| Point | Mols of $P_2O_5$ in the form of alkali metal polyphosphate per 100 mols of $SiO_2$ in the form of alkali metal silicate | Molar ratio of $SiO_2$ to $M_2O$ in alkali metal silicate |
| --- | --- | --- |
| A | 32.5 | 2.56 |
| B | 9.5 | 4.16 |
| C | 2.5 | 4.16 |
| D | 2.5 | 3.2 |
| E | 11.0 | 2.56 |
| F | 20.0 | 3.44 |
| G | 14.5 | 3.8 |
| H | 5.0 | 3.8 |
| J | 5.0 | 3.0 |
| K | 20.0 | 3.0 |

The amount of water in the film forming compositions of this invention may vary widely, the minimum amount being that which is sufficient to dissolve all of the alkali metal silicate and the alkali metal polyphosphate. Ordinarily the limits of the water content will be in the range of equiweights to about five times the total weight (anhydrous basis) of the alkali metal silicate and the alkali metal polyphosphate.

In preparing the film forming compositions of this invention the alkali metal polyphosphates can be used in anhydrous or hydrate form and either form can be added and intimately mixed with water and the alkali metal silicate. In that the alkali metal silicates are obtainable commercially in aqueous solutions it is preferred that they be employed as such and the polyphosphate in anhydrous or hydrate form be added thereto and additional water added to provide a homogeneous solution if necessary.

As illustrative of this invention but not limitative thereof the following aqueous solutions containing 100 mols of $SiO_2$ in the form of various alkali metal silicates identified below and an alkali metal polyphosphate identified below are prepared by mixing at room temperature:

|  | Mols of— | | | |
| --- | --- | --- | --- | --- |
|  | $Na_2O$ | $SiO_2$ | $P_2O_5$ | $H_2O$ |
| Example A: | | | | |
| sodium silicate I | 30 | 100 | | |
| sodium polyphosphate | 12 | | 10.8 | |
| water | | | | 843 |
| Example B: | | | | |
| sodium silicate I | 30 | 100 | | |
| sodium polyphosphate | 16.7 | | 15 | |
| water | | | | 924 |
| Example C: | | | | |
| sodium silicate I | 30 | 100 | | |
| sodium polyphosphate | 3.5 | | 3.2 | |
| water | | | | 763 |
| Example D: | | | | |
| sodium silicate I | 30 | 100 | | |
| sodium polyphosphate | 25.8 | | 23.2 | |
| water | | | | 999 |
| Example E: | | | | |
| sodium silicate I | 30 | 100 | | |
| water | | | | 726 |
| Example F: | | | | |
| sodium silicate II | 28.5 | 100 | | |
| sodium polyphosphate | 7.6 | | 6.8 | |
| water | | | | 831.6 |
| Example G: | | | | |
| sodium silicate II | 28.5 | 100 | | |
| sodium polyphosphate | 10.6 | | 9.6 | |
| water | | | | 864 |
| Example H: | | | | |
| sodium silicate II | 28.5 | 100 | | |
| sodium polyphosphate | 3.9 | | 3.5 | |
| water | | | | 788.6 |
| Example J: | | | | |
| sodium silicate II | 28.5 | 100 | | |
| sodium polyphosphate | 26.3 | | 23.6 | |
| water | | | | 751 |
| Example K: | | | | |
| sodium silicate II | 28.5 | 100 | | |
| water | | | | 751 |
| Example L: | | | | |
| sodium silicate III | 25.8 | 100 | | |
| sodium polyphosphate | 12.6 | | 11.4 | |
| water | | | | 1,030 |

The aqueous solutions of Examples A, B, C, D, E, F, G, H, J, K and L, respectively, are spread on a glass sheet of known weight and baked for one hour at 135° C. providing films of approximately 0.003 inch thickness. The respective coated glass sheets are weighed and then immersed in water for one hour at 45° C. The respective coated glass sheets are then removed, dried at 135° C. for 30 minutes, cooled to room temperature, weighed, and the weight loss noted. The percent weight losses of the respective films obtained and their physical appearance from the film forming aqueous solution of the respective examples are as follows:

| Example | Percent weight loss of film and its physical appearance |
| --- | --- |
| A | 6.5%; clear and transparent, continuous. |
| B | 5.0%; clear and transparent, continuous. |
| C | 31.6%; clear and transparent, continuous. |
| D | film flaked off glass in baking operation. |
| E | 71.0%; clear and transparent, continuous. |
| F | 5.2%; clear and transparent, continuous. |
| G | 9.0%; clear and transparent, continuous. |
| H | 23.0%; clear and transparent, continuous. |
| J | film flaked off glass in baking operation. |
| K | 56.0%; clear and transparent, continuous. |
| L | 6.2%; opalescent, continuous. |

In the foregoing Examples A through L inclusive "sodium silicate I" is an alkali metal silicate having a molar ratio of $SiO_2$ to $Na_2O$ of 3.33:1, "sodium silicate II" is an alkali metal silicate having a molar ratio of $SiO_2$ to $Na_2O$ of 3.51:1, "sodium silicate III" is an alkali metal silicate having a molar ratio of $SiO_2$ to $Na_2O$ of 3.87:1, and "sodium polyphosphate" is an amorphous linear alkali metal polyphosphate having a molar ratio of $Na_2O$ to $P_2O_5$ of 1.12 and having an average chain length of about 15.

As further illustrative of this invention but not limitative thereof the following aqueous solutions containing 100 mols of $SiO_2$ in the form of an alkali metal silicate identified below and various alkali metal phosphates identified below are prepared by mixing at room temperature:

|  | Mols of— | | | |
| --- | --- | --- | --- | --- |
|  | $Na_2O$ | $SiO_2$ | $P_2O_5$ | $H_2O$ |
| Example M: | | | | |
| sodium silicate I | 30 | 100 | | |
| sodium trimetaphosphate | 6.4 | | 6.4 | |
| water | | | | 930.4 |
| Example N: | | | | |
| sodium silicate I | 30 | 100 | | |
| sodium tetrametaphosphate | 6.4 | | 6.4 | |
| water | | | | 1089.8 |
| Example O: | | | | |
| sodium silicate I | 30 | 100 | | |
| 8 phosphate | 8.5 | | 6.4 | |
| water | | | | 805 |
| Example P: | | | | |
| sodium silicate I | 30 | 100 | | |
| Graham's salt | 6.4 | | 6.4 | |
| water | | | | 797.6 |
| Example Q: | | | | |
| sodium silicate I | 30 | 100 | | |
| disodium phosphate | 10.8 | | 6.4 | |
| water | | | | 1032 |
| Example R: | | | | |
| sodium silicate I | 30 | 100 | | |
| sodium pyrophosphate | 12.8 | | 6.4 | |
| water | | | | 1091 |
| Example S: | | | | |
| sodium silicate I | 30 | 100 | | |
| sodium ultraphosphate | 5.3 | | 6.4 | |
| water | | | | 763.9 |
| Example T: | | | | |
| sodium silicate I | 30 | 100 | | |
| lithium polyphosphate | (¹) | | 6.4 | |
| water | | | | 787 |

¹ 6.4 mols of $Li_2O$.

The aqueous compositions of Examples M, N, O, P, Q, R, S, and T, respectively are spread on glass sheets of known weight and baked for one hour at 135° C. providing films of approximately 0.003 inch thickness. The respective coated glass sheets are weighed and then immersed in water for one hour at 45° C. The respective coated glass sheets are then removed, dried at 135° C. for 30 minutes, cooled to room temperature, weighed, and the weight loss noted. The percent weight loss of the respective films obtained and their physical appearance from the film forming aqueous compositions of the respective examples are as follows:

| Example | Percent weight loss of film and its physical appearance |
|---|---|
| M | 12.8%; clear and transparent, continuous. |
| N | 2.7%; clear and transparent, continuous. |
| O | 4.6%; clear and transparent, continuous. |
| P | 10.3%; clear and transparent, continuous. |
| Q | 83.1%; clear and transparent, continuous. |
| R | 70.7%; clear and transparent, continuous. |
| S | 5.7%; slightly opalescent at film's edges, otherwise clear and transparent, continuous. |
| T | 4.2%; clear and transparent, continuous. |

In the foregoing examples M through T inclusive "sodium silicate I" is an alkali metal silicate having a molar ratio of $SiO_2$ to $Na_2O$ of 3.33:1, "sodium trimetaphosphate" is a crystalline ring polyphosphate having a molar ratio of $Na_2O$ to $P_2O_5$ of 1:1 and an empirical formula of $Na_3(PO)_3$, "sodium tetrametaphosphate" is a crystalline ring polyphosphate having a molar ratio of $Na_2O$ to $P_2O_5$ of 1:1 and an empirical formula of $Na_4(PO)_4$, "S phosphate" is an amorphous linear sodium polyphosphate having a molar ratio of $Na_2O$ to $P_2O_5$ of 1.33:1 and an average chain length of 4.5, "Graham's salt" is an amorphous linear sodium polyphosphate having a molar ratio of $Na_2O$ to $P_2O_5$ of 1:1 sometimes termed "sodium metaphosphate," "disodium phosphate" is the crystalline orthophosphate of sodium having the empirical formula $Na_2HPO_4$, "sodium pyrophosphate" is the crystalline polyphosphate of sodium, having the empirical formula $Na_4P_2O_7$ and a molar ratio of $Na_2O$ to $P_2O_5$ of 2:1; "sodium ultraphosphate" is an amorphous cross-linked sodium polyphosphate having a molar ratio of $Na_2O$ to $P_2O_5$ of 0.835:1, "lithium polyphosphate" is an amorphous linear polyphosphate having an average chain length of 44.

The film forming compositions of this invention can be applied to water-insoluble solid surfaces for coating and/or adhesive purposes such as metal, wood, paper and like cellulosic materials, by spraying, brushing or dipping the articles in a suitable vessel containing the film forming compositions of this invention, and thereafter heat drying, as for example, by baking the applied composition at 100 to about 200° C.

The films obtained upon heat drying the film forming compositions of this invention are continuous, impervious, and in general are clear and transparent, however, some films are opalescent or opaque but such does not detract from the adhesive, toughness or abrasion resistant properties which characterize the films obtained from the film forming compositions of this invention. The color of the films obtained may also vary by incorporating in the film forming compositions suitable inorganic pigments such as iron oxide, zinc oxide, titanium oxide, and the like. Also such materials as silica aerogel, clay and like fillers may be admixed therewith.

Other materials may be incorporated in the film forming compositions, as for example, magnesium silicate and amorphous magnesium polyphosphates in water soluble amounts up to about 20 percent of the alkali metal silicate content. Such compositions are useful as adhesives for various cellulosic materials, as for example, corrugated and solid fiber paperboard.

Also water-soluble amounts of an alkali metal borate such as borax ($Na_2B_4O_7 \cdot 10H_2O$) or sodium borate ($Na_2B_4O_7$) may be incorporated in the film forming compositions of this invention. For example, boron oxide, that is, $B_2O_3$, in the form of an alkali metal borate can be incorporated in an aqueous solution of an alkali metal silicate having a molar ratio of $SiO_2$ to $M_2O$ in the range of about 3.0:1 to about 3.8:1 and linear amorphous alkali metal polyphosphate of this invention to the extent of $b$ mols wherein the sum of $b$ and the number of mols of $P_2O_5$ in the form of linear amorphous alkali metal polyphosphate does not exceed 20 mols, the number of mols of $P_2O_5$ in the form of alkali metal polyphosphate being in the range of about 5 to about 20 mols, and provide compositions which on drying produce films characterized by firm adherence, toughness and abrasion resistance as well as excellent resistance to water and highly humid conditions.

As illustrative of the latter embodiment of this invention the following aqueous solutions are prepared by mixing at room temperature.

| | Mols of— | | | | |
|---|---|---|---|---|---|
| | $Na_2O$ | $SiO_2$ | $P_2O_5$ | $B_2O_3$ | $H_2O$ |
| Example U: | | | | | |
| sodium silicate I | 30 | 100 | | | |
| sodium polyphosphate | 13.5 | | 12.2 | | |
| sodium borate | 3.4 | | | 6.8 | |
| water | | | | | 1,170 |
| Example V: | | | | | |
| sodium silicate I | 30 | 100 | | | |
| sodium polyphosphate | 9.5 | | 8.6 | | |
| sodium borate | 3.2 | | | 6.4 | |
| water | | | | | 1,110.6 |
| Example W: | | | | | |
| sodium silicate I | 30 | 100 | | | |
| sodium polyphosphate | 6.7 | | 6.0 | | |
| sodium borate | 5.0 | | | 10.0 | |
| water | | | | | 1,197.5 |
| Example X: | | | | | |
| sodium silicate II | 28.5 | 100 | | | |
| sodium polyphosphate | 5.6 | | 5.1 | | |
| sodium borate | 2.8 | | | 5.6 | |
| water | | | | | 1,062.3 |
| Example Y: | | | | | |
| sodium silicate II | 28.5 | 100 | | | |
| sodium polyphosphate | 6.7 | | 6.0 | | |
| sodium borate | 0.65 | | | 1.3 | |
| water | | | | | 898.4 |
| Example Z: | | | | | |
| sodium silicate II | 28.5 | 100 | | | |
| sodium polyphosphate | 7.2 | | 6.5 | | |
| sodium borate | 2.2 | | | 4.4 | |
| water | | | | | 1,003.1 |
| Example AA: | | | | | |
| sodium silicate II | 28.5 | 100 | | | |
| sodium polyphosphate | 6.8 | | 6.1 | | |
| sodium borate | 1.35 | | | 2.7 | |
| water | | | | | 907 |
| Example BB: | | | | | |
| sodium silicate I | 30 | 100 | | | |
| sodium borate | 1.1 | | | 2.2 | |
| water | | | | | |

The aqueous solutions of Examples U, V, W, X, Y, Z, AA, and BB, respectively are spread on a glass sheet of known weight and baked for one hour at 135° C., providing films of approximately 0.003 inch thickness. The respective coated glass sheets are weighed and then immersed in water for one hour at 45° C. The respective coated glass sheets are then removed, dried at 135° C. for 30 minutes, cooled to room temperature, weighed, and the weight loss noted. The percent weight losses of the respective films obtained and their physical appearance from the respective film forming aqueous solution are as follows:

| Example | Percent weight loss of film and its physical appearance. |
|---|---|
| U | 4.4%; opalescent, continuous. |
| V | 4.3%; clear and transparent, continuous. |
| W | 7.4%; alligatored and transparent, continuous. |
| X | 6.1%; clear and transparent, continuous. |
| Y | 5.1%; clear and transparent, continuous. |
| Z | 3.0%; clear and transparent, continuous. |
| AA | 2.1%; clear and transparent, continuous. |
| BB | 40%; clear and transparent, continuous. |

In the foregoing Examples U through BB inclusive "sodium silicate I" is an alkali metal silicate having a molar ratio of $SiO_2$ to $Na_2O$ of 3.33:1, "sodium silicate II" is an alkali metal silicate having a molar ratio of $SiO_2$ to $Na_2O$ of 3.51:1; "sodium polyphosphate" is an amorphous linear alkali metal polyphosphate having a molar ratio of $Na_2O$ to $P_2O_5$ of 1.12 and having an average chain length of about 15.

The foregoing examples well illustrate the improved water-resistant film obtained from the film-forming compositions of this invention. Like results are also obtained when other water-insoluble articles than glass are coated with the film-forming compositions of this invention and heat dried, for example such metals as steel, galvanized iron, aluminum, copper, as well as cellulosic materials such as wood and the like. Water-resistant barrier wrap or barrier board suitable for the manufacture of water-resistant packages, cartons and containers are readily formed by applying by any suitable method the film forming compositions of this invention to paper or cardboard and heat drying, e.g. at 100 to about 200° C. The paper or cardboard can be coated on one or both sides. Where the paper or cardboard is contacted on either or both sides with a layer of paper or cardboard or other water-insoluble surface it should be coated on both sides and the composite heat dried. In addition to providing a water-resistant film between the layers, the respective layers are firmly adhered to one another. In the manufacture of corrugated paperboard the film-forming compositions of this invention are particularly useful. As illustrative of such, flutes are formed on straw paper by steaming the surface thereof over a fluted brass steam-heated roll. A composition of this invention (e.g. the composition of either Example A, B, L, N, T, U or AA) is then applied to the flute tips of one side and a paper sheet or liner is pressed tightly thereover, pressure being applied to effect rapid bond formation. The single faced sheet is then passed over a drying "bridge" to "double backer" adhesive station wherein the film-forming composition of this invention is applied to the opposite flute tips and pressed onto a second paper sheet or liner, and pressure applied to effect rapid bond formation. Corrugated paperboard so obtained is characterized by water resistance much greater than when aqueous alkali silicate alone is used as the adhesive.

While this invention has been described with respect to certain embodiments it is not so limited and it is to be understood that variations and modifications thereof obvious to those skilled in the art can be made without departing from the spirit or scope of this invention.

What is claimed is:

1. A film forming composition comprising an aqueous solution of an alkali metal silicate and an alkali metal polyphosphate, the said alkali metal silicate having a molar ratio of about 2.56 to about 4.16 mols of $SiO_2$ to one mol of $M_2O$ wherein M is an alkali metal, the said alkali metal polyphosphate containing more than two phosphorus atoms and having a molar ratio of $M'_2O$ wherein M' is an alkali metal to $P_2O_5$ of 0.8:1 to about 1.7:1, the molar amount of $P_2O_5$ in the form of the said alkali metal polyphosphate for each 100 mols of $SiO_2$ in the form of the said alkali metal silicate being in the range of about 2.5 to about 32.5, the molar proportions of $SiO_2$ and $P_2O_5$ being chosen so as to be represented by a point falling within the area bounded by the pentagon ABCDE on the chart shown in the attached Figure 1.

2. A film forming composition comprising an aqueous solution of sodium silicate and a sodium polyphosphate containing more than two phosphorus atoms, the said sodium silicate having a molar ratio of about 2.56 to about 4.16 mols of $SiO_2$ to one mol of $Na_2O$, the said sodium polyphosphate having a molar ratio of one to about 1.7 mols of $Na_2O$ to one mol of $P_2O_5$, the molar amount of $P_2O_5$ in the form of the said sodium polyphosphate for each 100 mols of $SiO_2$ in the form of the said sodium silicate being in the range about 2.5 to about 32.5, the molar proportions of $SiO_2$ and $P_2O_5$ being chosen so as to be represented by a point falling within the area bounded by the pentagon ABCDE on the chart shown in the attached Figure 1.

3. A film forming composition comprising an aqueous solution of sodium silicate and a linear amorphous sodium polyphosphate containing more than three phosphorus atoms, the said sodium silicate having a molar ratio of about 3.0 to about 3.8 mols of $SiO_2$ to one mol of $Na_2O$, the said sodium polyphosphate having a molar ratio of 1.1 to 1.55 mols of $Na_2O$ to one mol of $P_2O_5$, the molar amount of $P_2O_5$ in the form of the said sodium polyphosphate for each 100 mols of $SiO_2$ in the form of the said sodium silicate being in the range about 5 to about 20, the molar proportions of $SiO_2$ and $P_2O_5$ being chosen so as to be represented by a point falling within the area bounded by the pentagon FGHJK on the chart shown in the attached Figure 1.

4. A film forming composition comprising an aqueous solution of a sodium silicate, an amorphous linear sodium polyphosphate and an alkali metal borate, the said sodium silicate having a molar ratio of about 3.0 to about 3.8 mols of $SiO_2$ to one mol of $Na_2O$, the said sodium polyphosphate containing more than three phosphorus atoms and having a molar ratio of one to about 1.7 mols of $Na_2O$ to one mol of $P_2O_5$, the molar amount of $P_2O_5$ in the form of the said sodium polyphosphate for each 100 mols of $SiO_2$ in the form of the said sodium silicate being in the range of about 5 to about 20, the molar proportions of $SiO_2$ and $P_2O_5$ being chosen so as to be represented by a point falling within the area bounded by the pentagon FGHJK on the chart shown in the attached Figure 1, the molar amount of $B_2O_3$ in the form of the said alkali metal borate being $b$ mols wherein the total sum of $b$ and the number of mols of $P_2O_5$ in the form of said sodium polyphosphate does not exceed 20 mols.

5. The composition of claim 3 wherein the sodium silicate is characterized by a molar ratio of $SiO_2$ to $Na_2O$ of approximately 3.33:1.

6. The composition of claim 3 wherein the sodium silicate is characterized by a molar ratio of $SiO_2$ to $Na_2O$ of approximately 3.51:1.

7. The composition of claim 5 wherein the linear amorphous sodium polyphosphate is characterized by a molar ratio of $Na_2O$ to $P_2O_5$ of 1.12:1 and possesses a chain length of about 15.

8. The composition of claim 6 wherein the linear amorphous sodium polyphosphate is characterized by a molar ratio of $Na_2O$ to $P_2O_5$ of 1.12:1 and possesses a chain length of about 15.

9. The composition of claim 4 wherein the linear amorphous sodium polyphosphate is characterized by a molar ratio of $Na_2O$ to $P_2O_5$ of about 1.1:1 to about 1.55:1.

10. The composition of claim 9 wherein the alkali metal borate is sodium borate.

11. The method of coating which comprises applying to a water-insoluble surface a composition comprising as the essential film-forming material the composition of claim 1 and then heat drying the composition.

12. The method of coating which comprises applying to a water-insoluble surface a composition comprising as the essential film-forming material the composition of claim 3 and heat drying the composition.

13. The method of coating which comprises applying to a water-insoluble surface a composition comprising as the essential film-forming material the composition of claim 4 and heat drying the composition.

14. A water-insoluble article having an adherent coating of the composition of claim 1.

15. A water-insoluble article having an adherent coating of the composition of claim 3.

16. A water-insoluble article having an adherent coating of the composition of claim 4.

References Cited in the file of this patent

UNITED STATES PATENTS

| | | |
|---|---|---|
| 1,975,077 | Boughton | Oct. 2, 1934 |
| 2,077,258 | Pitt et al. | Apr. 13, 1937 |
| 2,699,432 | Marra et al. | Jan. 11, 1955 |